(No Model.)
G. F. DIETRICH & E. B. DONOVAN.
BICYCLE TOP.
No. 550,709.  Patented Dec. 3, 1895.
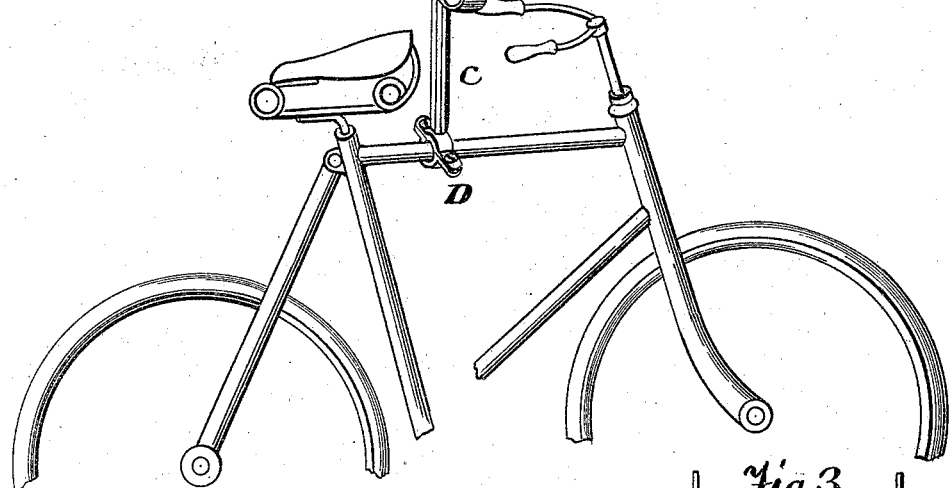
Fig. 1.
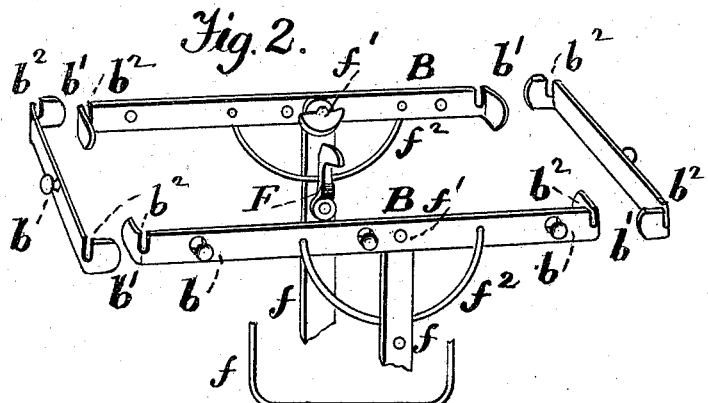
Fig. 2.
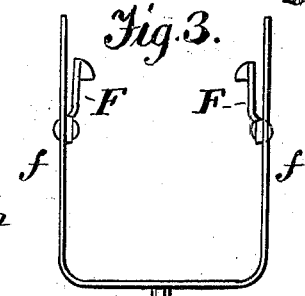
Fig. 3.
Fig. 4.
Witnesses.
A. Ruppert,
H. A. Daniels
Inventors.
George F. Dietrich,
Edward B. Donovan,
Per
Thomas P. Simpson
atty

UNITED STATES PATENT OFFICE.

GEORGE F. DIETRICH AND EDWARD B. DONOVAN, OF LITTLE ROCK, IOWA.

BICYCLE-TOP.

SPECIFICATION forming part of Letters Patent No. 550,709, dated December 3, 1895.

Application filed August 24, 1895. Serial No. 560,371. (No model.)

*To all whom it may concern:*

Be it known that we, GEORGE F. DIETRICH and EDWARD B. DONOVAN, citizens of the United States, residing at Little Rock, in the county of Lyon and State of Iowa, have invented certain new and useful Improvements in Bicycle-Tops; and we do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a bicycle top or canopy which will be light, cheap, and have separable parts, the same being adapted to be rolled up into a small compass and quickly taken apart or put together.

Figure 1 of the drawings is a perspective view of the frame, the cloth having been partially removed and the upright fork being fastened to the bicycle; Fig. 2, a detail of the cloth-frame with the sides and ends separated; Fig. 3, a detail end view of the fork. Fig. 4 shows a modification of the fork-shank.

In the drawings, A represents any suitable cloth, which may be stretched over the frame B and secured on buttons thereof, so as to fall over at the sides and ends.

C is the fork, the ends of whose arms $f f$ are clamped to the inside of the sides of the frame B by the screw-pivots $f' f'$, so that the canopy may be arranged at any desired angle to a horizontal plane.

On the outside of the frame B are secured the arc rods $f^2 f^2$, to which the fork-arms $f f$ are held by the interior pivoted spring-clamps F F.

The shank $c$ of the fork may be polygonal, as shown in Fig. 1 of the drawings, or trussed, as shown in Fig. 4 of the drawings, the same being preferably trussed where one of extra length is required. The fork-arms are made elastic to take up the jar and strain on the bicycle when the latter is running on rough or uneven roads.

The frame B is made in four detachable parts, which lock together at the ends by the right-angled bends $b$ and the slots $b'$, so that they may be detached and folded with the cloth in a small compass, while the fork, being held to the bicycle-rod by the screw-clamp D, may also be readily detached. The spring-clamps F F may be pushed off the arc braces $f^2 f^2$ when it is wished to adjust the frame B.

The sides and ends of the frame B are put together by locking the downslots of the end pieces in the upslots of the side pieces, the terminal bends on the ends of pieces serving to prevent any play of the parts on one another and to give rigidity to the frame.

Having thus described all that is necessary to a full understanding of our invention, what we claim as new, and desire to protect by Letters Patent, is—

In a bicycle canopy, the frame consisting of side and end pieces removably held together by means of interlocking notches in their edges, said side-pieces having downwardly extending arc rods $f^2 f^2$, in combination with a detachable projecting forked support having screw pivots $f' f'$ and spring clamps bearing against said arc-rods substantially as described.

In testimony whereof we affix our signatures in presence of two witnesses.

GEORGE F. DIETRICH.
EDWARD B. DONOVAN.

Witnesses:
F. M. WRIGHT,
W. B. BURTON.